Aug. 16, 1960     W. D. HARRISON     2,949,035
WINDSHIELD WIPER ACTUATING MECHANISM
Original Filed Aug. 19, 1954     2 Sheets-Sheet 1
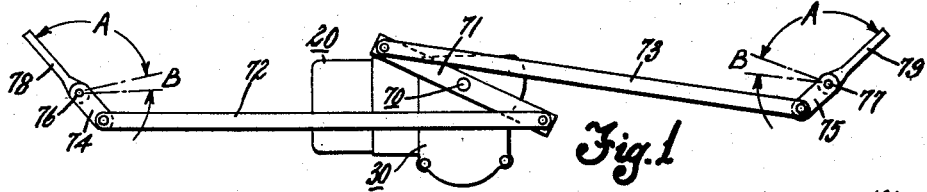
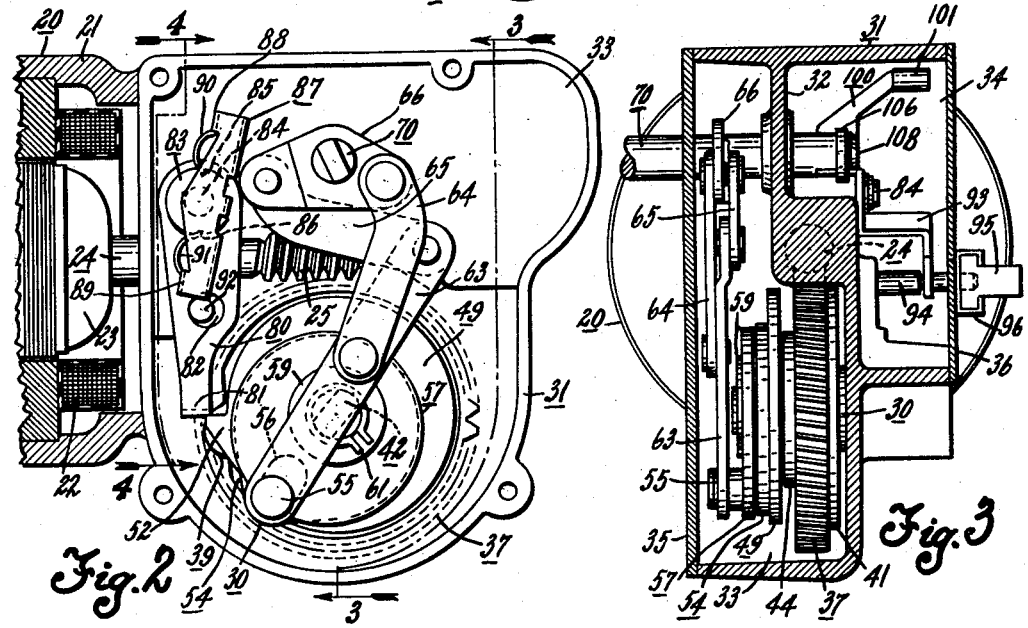
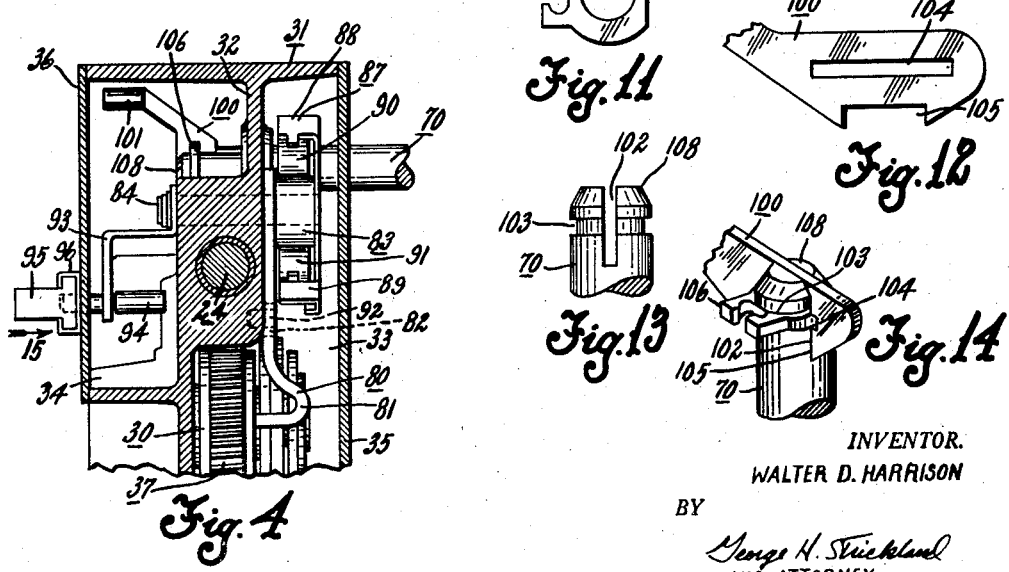
INVENTOR.
WALTER D. HARRISON
BY
George H. Strickland
HIS ATTORNEY Aug. 16, 1960 W. D. HARRISON 2,949,035
WINDSHIELD WIPER ACTUATING MECHANISM
Original Filed Aug. 19, 1954 2 Sheets-Sheet 2
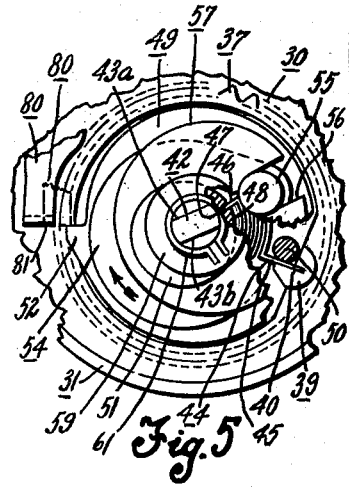
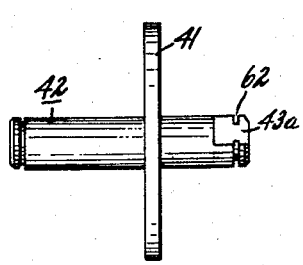
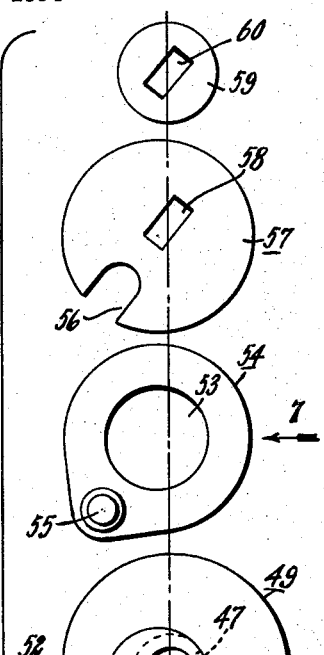
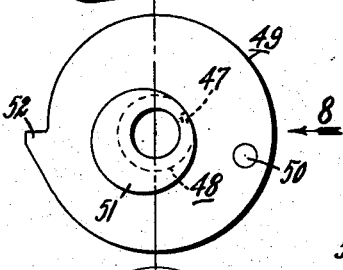
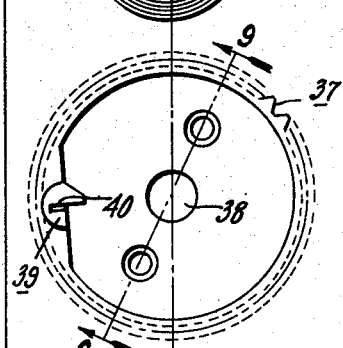
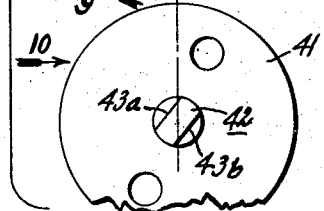
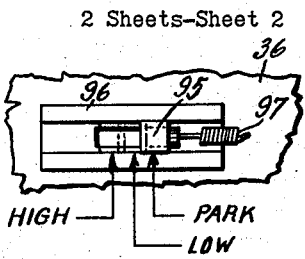
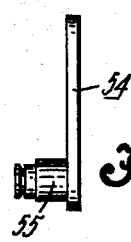
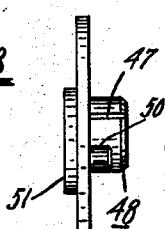
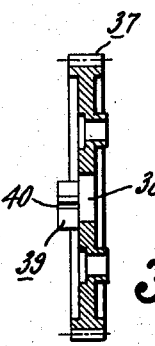
INVENTOR.
WALTER D. HARRISON
BY
George N. Strickland
HIS ATTORNEY

United States Patent Office 2,949,035
Patented Aug. 16, 1960

---

2,949,035

WINDSHIELD WIPER ACTUATING MECHANISM

Walter D. Harrison, Rochester, N.Y., assignor to General Motors Corporation, Detroit, Mich., a corporation of Delaware Continuation of application Ser. No. 450,890, Aug. 19, 1954. This application Dec. 11, 1958, Ser. No. 779,683

17 Claims. (Cl. 74—70)

This invention pertains to mechanical movements, and particularly to mechanism for converting rotation to oscillation including means for varying the amplitude of oscillation imparted to a driven member which may be used to actuate windshield wipers. This application is a continuation of forfeited application Serial No. 450,890, filed August 19, 1954, now abandoned.

Heretofore, it has been proposed to incorporate a disc having a cam slot of varying radius so as to vary the throw of a crank pin received in the cam slot. Arrangements of this type are disclosed in my copending application, Serial No. 435,012, filed June 7, 1954, now Patent No. 2,861,457, and copending application, Serial No. 221,048, filed April 14, 1951, in the name of Lautzenhiser et al., now Patent No. 2,749,498. However, mass production of discs having cam slots of critical dimensions has not proved to be feasible. Thus, the present invention discloses an assembly for performing the same function as the cam slotted disc, which assembly is more economical to manufacture and assemble. Accordingly, among my objects are the provision of a mechanical movement for converting rotation to oscillation including means for varying the amplitude of oscillation; the further provision of a mechanical movement of the aforesaid character including means for controlling the amplitude of oscillation imparted to a driven member; and the still further provision of improved means for retaining an arm assembled with a shaft.

The aforementioned and other objects are accomplished in the present invention by the provision of an eccentric mechanism for varying the radial distance of a crank plate from the axis of rotation of a shaft. Specifically, the improved crank assembly comprises a shaft; a yoke member connected to rotate with the shaft; a cam having a circular aperture and carrying a crank pin; a disc assembly having attached thereto an eccentric; a torsion spring; a worm gear; and a plate. The plate is attached to the shaft and rigidly connected to the worm gear. The shaft is rotatably supported in a housing, the worm gear drivingly engaging a worm driven by a multispeed, unidirectional electric motor. The worm gear is formed with a projection that extends axially from the face of the gear teeth and radially to the root, or dedendum, circle of the gear teeth. The projection is also formed to constitute a seat for the outer end of the torsion spring, the inner end of which is disposed in a slot of a sleeve forming a component of the disc assembly. The disc assembly is journalled for rotation about the shaft, the eccentric portion thereof being disposed in the aperture of the cam. The crank pin of the cam is received in a radial slot of the yoke, this arrangement permitting radial movement of the cam and crank pin relative to the yoke while preventing relative rotation therebetween. The several parts are maintained in assembled relation by means of a washer and snap ring, the yoke having a rectangular opening which engages flats on one end of the shaft so that rotation of the shaft will impart rotation to the yoke and cam.

During normal operation, the prestressed torsion spring will position the eccentric so that the crank pin is located at a minimum radial distance from the axis of the shaft, and the disc assembly will be rotated with the shaft through the torsion spring. Thus, the torsion spring, in effect, constitutes a yieldable coupling between the disc assembly and the shaft or worm gear. By virtue of this yieldable coupling and the location of a stop pin limiting unwinding movement of the torsion spring, the cam and disc assembly may also be said to be connected through lost motion means, inasmuch as a predetermined relative angular movement may occur between the disc assembly and the cam. The disc assembly constitutes a driven element and the shaft, or worm gear, constitutes a driving member for the windshield wiper actuating mechanism. The crank pin, in the disclosed embodiment, is operatively connected with an oscillatable shaft constituting a driven member. The operative connection between the crank pin and the shaft includes a linkage comprising a swingable connecting rod, a pair of crossed links and a rocker arm which is attached to and rotatable with the driven member. This linkage is of the type disclosed in my aforementioned patent.

In order to increase the amplitude of oscillation imparted to the driven member, the actuating mechanism includes a latch assembly arranged to engage a peripheral abutment, or lug, on the disc assembly so as to restrain rotation thereof. The latch assembly may be manually positionable through a Bowden wire connection from a suitable-dashboard control knob. The latch assembly includes a shaft which is rotatably mounted within the housing, this shaft having connected thereto a crank arm having connection with a slide. The shaft is connected through a pair of arcuate shaped springs to a latch arm which is rotatably journaled on the shaft. The arcuate springs constitute a toggle mechanism for effecting snap action movement of the latch arm into and out of the path of movement of the peripheral abutment on the disc assembly. When the peripheral disc abutment engages the latch arm, continued rotation of the shaft, yoke and cam throughout an angular distance of substantially 155° will cause the cam to shift radially due to its engagement with the disc carried eccentric. In this manner, the radial distance between the crank pin and the axis of the shaft will be increased so as to increase the amplitude of oscillation imparted to the driven member. When the amplitude of oscillation imparted to the driven member is a maximum, suitable switch means of the type disclosed in my aforementioned patent may be actuated by the driven member so as to simultaneously deenergize the electric motor and dynamically brake the motor to a standstill. In this manner, the blades are automatically positioned in the parked position when the mechanism is inactive.

When the operator initiates operation of the mechanism, the radial projection on the worm gear disengages the latch arm from the peripheral disc abutment, thereby permitting the torsion spring to unwind throughout an angular distance of substantially 155° so as to reposition the crank pin at a minimum radius from the axis of the shaft. It is to be understood that when the disc assembly is restrained against rotation, continued rotation of the worm gear will wind up the torsion spring.

The oscillatable shaft, or driven member has attached thereto a switch actuator comprising a crank arm and pin assembly. The crank arm is formed with a slotted and notched end. The notched end is received in an axial slot formed in the end of an oscillatable shaft, the oscillatable shaft also having an annular groove adjacent this end. The crank arm is retained in assembled relation with the shaft by means of a plastic snap retainer, which comprises a generally C-shaped member. The snap retainer is received by the annular groove in the shaft after being inserted through the slot in the crank arm.

Further objects and advantages of the present invention will be apparent from the following description, reference being had to the accompanying drawings wherein a preferred embodiment of the present invention is clearly shown.

In the drawings:

Fig. 1 represents a diagrammatic view of the actuating mechanism of this invention in combination with windshield wiper blades and interconnecting links.

Fig. 2 is a fragmentary view, partly in section and partly in elevation, of actuating mechanism constructed according to this invention, the driven member being shown in the parked position.

Figs. 3 and 4 are views, partly in section and partly in elevation, taken along lines 3—3 and 4—4, respectively, of Fig. 2, the latch assembly being removed in Fig. 3 and the link assembly being removed in Fig. 4.

Fig. 5 is a fragmentary view, partly in section and partly in elevation, of the actuating mechanism in the running position, the link assembly being removed from the crank pin.

Fig. 6 is an exploded view of certain parts of the variable crank throw assembly, illustrating their relative positions when the mechanism is in the parked position.

Figs. 7, 8 and 10 are views, in elevation, taken in the direction of arrow 7, 8 and 10, respectively, in Fig. 6.

Fig. 9 is a sectional view taken along line 9—9 of Fig. 6.

Fig. 11 is a view, in elevation, of the snap retainer.

Fig. 12 is a fragmentary view, in elevation, of the crank arm constituting a part of the switch actuator.

Fig. 13 is a fragmentary view of one end of the oscillatable shaft, or driven member.

Fig. 14 is a fragmentary view, in elevation, of the manner in which the parts in Figs. 11, 12 and 13 are assembled.

Fig. 15 is a fragmentary view, in elevation, taken in the direction of arrow 15 of Fig. 4.

With particular reference to Fig. 1, a windshield wiper installation is shown including a unidirectional electric motor 20, which is drivingly connected with motion converting mechanism generally depicted by the numeral 30. The motion converting mechanism includes an oscillatory shaft or driven member 70, which is shown schematically connected to a double crank 71, opposite ends of which are pivotally connected to a pair of links 72 and 73, the other ends of which are pivotally connected to rocker arms 74 and 75, respectively. The rocker arms 74 and 75 are operatively connected to spaced rock shafts 76 and 77, which are, in turn, connected to spaced wiper arms 78 and 79, respectively. During oscillatory movement of the shaft 70, oscillatory movement will be imparted to the wiper arms 78 and 79, the wiper arms being arranged to carry wiper blades, not shown. During normal running operation of the actuating mechanism 30, the arms 78 and 79 are moved throughout a wiping stroke, designated by the angle A. The motion converting mechanism may be adjusted so that the amplitude of oscillation imparted to the arms 78 and 79 is increased to the angle A+B, thereby moving the arms 78 and 79 to a parked position against the cowl of a motor vehicle, not shown.

With reference to Figs. 2 through 10, the motion converting mechanism 30 is disposed within a housing 31. The housing includes an integral, intermediate web 32 which separates the housing into chambers 33 and 34. Chamber 33 is closed by a cover plate 35 and contains the mechanical movement, while chamber 34 is closed by cover plate 36 and contains the switch means, not shown, for controlling the electric motor 20. The electric motor 20 includes a housing 21, which is suitably connected to the housing 31. The electric motor is preferably of the cumulative compound wound, direct type and, thus, includes field windings 22 and an armature 23. The armature includes a shaft 24, the outer end of which is formed as a worm 25.

The worm 25 drivingly engages a worm gear 37. As shown in Figs. 6 and 9, the worm gear 37 is formed with a centrifugally disposed circular opening 38 and a projection 39, which extends axially of the face of the gear teeth and radially to the root or dedendum, circle of the gear teeth. The projection 39 is formed with a radial slot 40. The worm gear 37 is designed for attachment to a plate member 41 depicted in Figs. 6 and 10. The plate member is suitably connected to a shaft 42, by means of a weld. The worm gear 37 and the plate member 41 may be connected by a pair of rivets, not shown, which pass through aligned openings therein. The shaft 42 is formed with a pair of flats 43a and 43b adjacent one end thereof, the purpose of which will be described hereinafter. The crank assembly also includes a torsion spring 44, as depicted in Fig. 6. The outer turn of the torsion spring 44 includes an outwardly bent tang portion 45 and the inner turn of the torsion spring includes an inwardly bent tang 46. The outwardly bent tang 45 is received in the radial slot 40 of the worm gear projection 39.

As depicted in Figs. 6 and 8, the inner tang 46 of the torsion spring 44 is received in a slot 47 of a sleeve 48, which is concentric with the shaft 42. The sleeve 48 is attached to a disc 49 which carries an axially extending pin 50. The sleeve 48 also includes an eccentric portion 51, which is disposed on the opposite side of the disc 49 from the concentric sleeve. The disc 49 is also formed with a peripheral abutment 52, the purpose of which will be described hereinafter. When the torsion spring 44 is assembled with the worm gear 37 and the disc assembly 49, the torsion spring is prestressed. That is, the torsion spring is wound up throughout a predetermined angular distance of substantially 180°. Thus, in the normal position of the assembled disc 49, spring 44 and gear 37, the spring 44 tends to unwind and the outwardly extending tang portion 45 thereof engages the pin 50. The spring 44 also constitutes a yieldable coupling between the worm gear 37 and the disc assembly 49. The eccentric portion 51 is received by an aperture 53 in a cam member, or crank, 54. The cam member 54 carries an axially extending crank pin 55, as shown in Figs. 6 and 7. The crank pin 55 is received in a radial slot 56 of a yoke, or drive arm, 57, the yoke having a rectangular opening 58 therein arranged to be received by the flats 43a and 43b of shaft 42, as shown in Fig. 6. The several component parts of the mechanical movement, as shown in Fig. 6, are retained in assembled relation with the shaft 42 by means of a washer 59 having a rectangular opening 60 and a snap type retaining ring 61, which is received in an annular groove 62 of the shaft 42.

By virtue of the stop pin 50 on the disc assembly 49 and the interengaging eccentric 51 and aperture 53 on the cam 54, the cam 54 and the disc assembly 49 may be said to be connected through a lost motion means. That is, the cam 54 can be rotated relative to the disc assembly 49. However, rotation of the cam 54 relative to the yoke 57 is prevented by the slot 56, which receives the crank pin 55.

The shaft 42 is supported by suitable bearing means, not shown, within the housing 31. The crank pin 55 is pivotally connected to one end of a swingable connecting rod 63. The connecting rod 63 is operatively connected to the shaft 70 through a linkage of the type disclosed in my aforementioned copending application. This linkage comprises a pair of crossed links 64 and 65, one end of link 65 being connected to the end of connecting rod 63 and one end of the link 64 being pivotally connected to an intermediate portion of the connecting rod. The outer ends of links 64 and 65 are pivotally connected to the ends of a rocker arm 66, which is rotatably connected to the shaft 70. Inasmuch as the shafts 42 and 70 are interconnected through a linkage constituted by the crank pin 55, the connecting rod 63, the links 64 and 65, and the rocker arm 66, and by virtue of the fact that the radius, and therefore the orbit, of the crank pin 55 may be varied, it may be said that the linkage aforedescribed is of variable effective length depending upon the position of the crank pin 55 with regard to the axis of the shaft 42. The function of the linkage including crossed links 64 and 65 and the rocker arm 66 is fully described and claimed in my aforementioned patent and, hence, constitutes no part of this invention.

The motion converting mechanism 30 is shown in the parked position in Fig. 2 and in the running position in Fig. 5. Normally, the prestressed torsion spring 44 will be in the position depicted in Fig. 5 wherein the outwardly extending tang portion 45 thereof engages the stop pin 50 of the disc assembly 49. In this position, the crank pin 55 is located a minimum radial distance from the axis of shaft 42, inasmuch as the crank pin 55 is radially aligned with the portion of the eccentric 51, which is a minimum radial distance from the axis of shaft 42. Thus, during rotation of the worm gear 37 in a clockwise direction, as viewed in Fig. 5, the disc assembly 49 will be driven in a clockwise direction through the yieldable coupling constituted by the torsion spring. Hence, the radius of the crank pin 55 will be maintained at a minimum so that oscillation of an amplitude designated by the angle A in Fig. 1, will be imparted to the driven member 70 and the wiper arms 78 and 79.

In order to effect relative angular movement between the shaft 42 and the cam 54, and the disc assembly 49, which components constitute the driving member and the driven element of the motion converting mechanism, the actuating mechanism includes a latch arm 80, as shown in Figs. 2, 4 and 5. The latch arm is formed with a U-shaped end portion 81, an intermediate aperture 82 and a hub 83 adjacent the other end. The hub 83 is journaled for rotation about a shaft 84, the hub 83 having diametrically opposed peripheral notches 85 and 86. The latch assembly also includes a toggle arm 87, which is rigidly connected with the shaft 84. The toggle arm 87 includes a pair of spaced, opposed tang portions 88 and 89. A pair of arcuate shaped toggle springs 90 and 91 have their opposite ends received by the tangs 88 and 89 and the notches 85 and 86, respectively, of the hub 83. The toggle assembly is of the over-center type. In other words, when the centers of the springs 90 and 91 are moved across the axis of shaft 84, the springs 90 and 91 will snap the latch arm 80 in one direction or the other, angular movement of the latch arm 80 being limited by a stop pin 92, which projects into the opening 82 therein.

The shaft 84 is rotatably supported in the web 32 of the housing, and extends into the switch chamber 34. This end of the shaft 84 has attached thereto a crank arm 93, which carries a crank pin 94. As depicted in Figs. 4 and 15, the crank pin is received in a recess of a slider 95 mounted for reciprocable movement within a guide 96 on the cover plate 36. The slider 95 may be attached to a Bowden wire 97, which may be connected to a manually operable dashboard knob in the vehicle, not shown. When the slider 95 is moved to the parked position, as viewed in Fig. 15, the shaft 84 has imparted thereto clockwise rotation, as viewed in Fig. 2. Thus, the toggle arm 87 will be moved to the position shown in Fig. 2 whereupon the latch arm 80 will be snapped to the position shown in Fig. 2. When the slider 95 is moved to either the low or high positions, as indicated in Fig. 15, the toggle arm 87 is moved in a clockwise direction over the axis of the shaft 84 so that the springs 90 and 91 snap the latch arm 80 from the dotted line position of Fig. 5 to the full line position thereof.

Movement of the slider 95 between the low and high positions, as depicted in Fig. 15, does not effect the position of latch arm 80 since the springs 90 and 91 have already passed their over-center position.

As disclosed in my aforementioned patent, the electric motor 20 may include a self-generative dynamic braking circuit. Thus, suitable switch means, not shown, are disposed within the switch chamber 34. When the amplitude of oscillation imparted to the driven member 70 is increased to the angle $A+B$, the switch means are actuated to energize the motor and simultaneously therewith dynamically brake the motor. Thus, armature rotation is instantaneously arrested and the blades come to rest in the parked position. With particular reference to Figs. 3, 4 and 11 through 14, the means for actuating the dynamic braking switch are shown. These means comprise a crank arm 100, the free end of which carries a pin, or roller, 101 adapted to actuate the switch means, not shown. In order to facilitate quick assembly of the crank arm 100 with the end of the shaft 70, the shaft 70 is formed with an axially extending diametral slot 102, as seen in Fig. 13. In addition, this end of the shaft 70 is formed with an annular groove 103 and a chamfered end 108. The crank arm 100 is formed with a slot 104 and a notch 105, the notch 105 being of a length substantially equal to the outer diameter of the shaft 70. The crank arm 100 is assembled with the shaft 70 by means of a plastic retainer 106, which is generally C-shaped in cross section. In assembling the crank arm 100 to the shaft 70, the retainer 106 is inserted into the slot 104 and, thereafter, the crank arm 100 and the retainer 106 are slipped over the end of the shaft 70. The crank arm 100 is received within the axially extending slot 102 and the retainer 106 is snapped into the annular groove 103. In this manner, the shaft 70 and the crank arm 100 are rotatably connected. The slot 104 is sufficiently long to allow for the expanded diameter of the retainer 106 when the retainer is forced over the end 108 of the shaft 70.

*Operation*

Operation of the improved actuating mechanism is as follows. With the motion converting mechanism in the parked position, as shown in Fig. 2, movement of the slider 95 to either the low or high positions will move the toggle arm 87 in a counterclockwise direction, as viewed in Fig. 2. Ordinarily, when the springs 90 and 91 pass through the plane of the axis of shaft 42, the latch arm 80 will snap from the position of Fig. 2 to the position of Fig. 5. However, the frictional engagement of the latch arm 80 with the peripheral abutment 52 may prevent the springs 90 and 91 from moving the latch arm 80 in a clockwise direction, as viewed in Fig 2. However, the projection 39 on the worm gear will impart clockwise movement to the latch arm 80 as soon as the motor 20 is energized and imparts rotation to the worm gear 37. Thus, the projection 39 constitutes both a safety means for preventing undesirable over winding of the torsion spring 44 if the motor should fail to be stopped promptly after the blades have been moved to the parked position, and as a means for positively disengaging the latch arm 80 when wiper operation is initiated. As soon as the latch arm 80 is disengaged from the peripheral abutment 52 of the disc assembly 49, the spring 44 will unwind until the tang portion 45 thereof engages the pin 50. At this time, the radius of the crank pin 55 will be at a minimum, and continued rotation of the worm gear 37 will impart oscillation to the driven member 70 so as to move the wiper blades throughout their wiping stroke.

When it is desired to park the wiper blades, the operator need only move the slider to the parked position whereupon the toggle arm 87 will be moved to the position of Fig. 2 so as to move the latch arm with a snap action from the full line position of Fig. 5 to the position of Fig .2. Rotation of the worm gear 37 and the disc 49 through the torsion spring 44 will continue until the peripheral abutment 52 engages the end 81 of the latch arm 80. At this time, rotation of the disc assembly 49 will be restrained, and continued rotation of the cam member 54 will cause the cam member 54 to move radially relative to the yoke 57 as it moves around the eccentric 51. When the parts assume the position shown in Fig. 2 wherein the radius of the crank pin 55 is a maximum, the crank arm 100 will be in a position wherein it actuates the motor controlling switch means, not shown, so as to simultaneously deenergize the motor and establish a dynamic braking circuit therefor. Thus, the parts of the motion converting mechanism 30 will come to rest in the position depicted in Fig. 2.

While the embodiment of the present invention as herein disclosed, constitutes a preferred form, it is to be understood that other forms might be adopted.

What is claimed is as follows:

1. Windshield wiper actuating mechanism including, a rotatable driving member, a driven element rotatably journaled on and yieldably coupled to said driving member, a wiper actuating driven member, means interconnecting said driving and driven members including a variable throw crank, and means whereby stopping rotation of said yieldably coupled driven element during continued rotation of said driving member varies the throw of said crank, said last recited means comprising a cam which carries said crank, said cam having a circular aperture therein, and a complementary circular eccentric received in said aperture and connected to said driven element.

2. A variable throw crank mechanism for actuating windshield wipers including in combination, a rotatable shaft, a first member connected to rotate with said shaft but adapted for radial movement relative thereto, a second member rotatably journaled on and yieldably coupled to said shaft, lost motion mechanism interconnecting said two members including a circular eccentric carried by one of said members and a complementary circular aperture in the other of said members within which said eccentric is received, and means for effecting relative movement between said first and second members.

3. A variable throw crank assembly including, a rotatable shaft, a crank mechanism connected to rotate with said shaft but adapted for radial movement relative thereto, a disc assembly rotatably journaled on said shaft, a torsion spring yieldably coupling said disc assembly to said shaft so that said disc assembly is rotatable with said shaft, and means interconnecting said disc assembly and said crank mechanism including an eccentric whereby arresting rotation of said disc assembly during rotation of said shaft will effect radial movement of said crank mechanism relative to said shaft.

4. A variable throw crank assembly including, a rotatable shaft, a first member connected to rotate with said shaft and having a radial slot, a second member having a circular aperture and carrying a crank pin which is received in the radial slot of said first member, said second member being constrained for rotation with said shaft by reason of said crank pin being received in said radial slot but adapted for radial movement relative to said shaft, a disc assembly rotatably supported on said shaft, a torsion spring yieldably coupling said disc assembly to said shaft for rotation therewith, an eccentric carried by said disc assembly and disposed in the circular aperture of said second member whereby relative rotation between said disc assembly and said second member will effect radial movement of said second member relative to said shaft so as to vary the throw of said crank pin.

5. A variable throw crank assembly including, a rotatable shaft, a yoke connected to rotate with said shaft and having a radial slot, a cam having a circular aperture and carrying a crank pin which is received in the radial slot of said yoke whereby said cam member is constrained for rotation with said yoke and said shaft but adapted for radial movement relative thereto, a disc assembly rotatably journaled on said shaft, a torsion spring yieldably coupling said disc assembly to said shaft for rotation therewith, a pin carried by said disc assembly constituting a stop for one end of said torsion spring whereby said disc assembly is normally positioned so that the radius of said crank pin is maintained at a minimum, and an eccentric carried by said disc assembly and received in the circular aperture of said cam whereby arresting rotation of said disc assembly will cause outward radial movement of said cam and crank pin during continued rotation of said shaft.

6. A variable throw crank assembly including, a rotatable shaft, a gear connected to said shaft for imparting rotation thereto, a yoke connected to rotate with said shaft and having a radial slot, a cam having a circular aperture and carrying a crank pin which is received within said radial slot whereby said cam is constrained for rotation with said yoke and shaft but adapted for radial movement relative thereto, a disc assembly mounted for rotation on said shaft, a torsion spring, opposite ends of which are connected with said disc assembly and said gear for yieldably coupling said disc assembly to said gear and shaft for rotation therewith, a pin carried by said disc assembly constituting a stop for one end of said torsion spring whereby the disc assembly is normally positioned so that the radius of said crank pin is a minimum, and an eccentric carried by said disc assembly and received in the circular aperture of said cam whereby effecting relative rotation between said disc assembly and said cam will effect outward radial movement of said cam and crank pin.

7. A crank assembly in accordance with claim 6 wherein said disc assembly includes a sleeve concentric with said shaft and having a radial slot, the inner end of said torsion spring being received in the slot in said sleeve, and wherein said gear is formed with a slotted projection within which the outer end of said torsion spring is received.

8. Windshield wiper actuating mechanism including, a rotatable driving member, a wiper actuating driven member, a rotatable driven element yieldably coupled to said driving member, means interconnecting said driving and driven members including a variable throw crank, means whereby arresting rotation of said driven element during continued rotation of said driving member will vary the throw of said crank, said driven element having a peripheral abutment, a latch arm movable about a rotatable pivot, the axis of which is parallel to the axis of said driving member, said latch arm being movable into the path of said peripheral abutment so as to arrest rotation of said driven element, and means including said rotatable pivot for effecting snap action movement of said latch arm from a normal position into the path of movement of said peripheral abutment.

9. Actuating mechanism in accordance with claim 8 wherein said last recited means also includes a toggle assembly.

10. Actuating mechanism in accordance with claim 9 wherein the pivot for said latch arm comprises a shaft, and wherein said toggle assembly comprises a toggle arm and a pair of arcuate shaped springs, opposite ends of said arcuate shaped springs being operatively connected to said toggle arm and a hub attached to said latch arm, and means for effecting angular movement of said shaft so that said arcuate shaped springs pass over the axis of said shaft so as to effect snap movement of said latch arm about said shaft.

11. Windshield wiper actuating mechanism including, a rotatable driving member, a wiper actuating driven member, a rotatable driven element yieldably coupled to said driving member, means interconnecting said driving and driven members including a variable throw crank, means whereby arresting rotation of said driven element during continued rotation of said driving member will vary the throw of said crank, said driven element having a peripheral abutment, a housing within which said actuating mechanism is disposed, a shaft rotatably supported in said housing, the axis of said shaft being parallel with the axis of said driving member, a latch arm rotatably mounted on said shaft having an end adapted for movement into the path of movement of said peripheral abutment so as to arrest rotation of said driven element, and means for effecting pivotal movement of said latch arm including an over-center toggle assembly attached to said shaft and a manually movable crank arm for effecting angular movement of said shaft so as to actuate said toggle mechanism.

12. Windshield wiper actuating mechanism including, a rotary driving member, an eccentric rotatably journaled on the driving member, a crank rotatably journaled on the eccentric, means operatively connecting the driving member and the crank for imparting rotation thereto, and means controlling the position of said eccentric to control the effective throw of said crank.

13. Windshield wiper actuating mechanism including, a rotary driving member, an eccentric rotatably journaled on the driving member, a crank rotatably journaled on the eccentric, a drive arm connected to said driving member, means operatively connecting said drive arm and said crank for imparting rotation thereto, and means for controling the position of said eccentric to control the effective throw of said crank.

14. Windshield wiper actuating mechanism including a rotary driving member, an eccentric rotatably journaled on said driving member, a crank rotatably journaled on said eccentric, a drive arm connected to said driving member, a pin and slot connection between said drive arm and said crank for imparting rotation to said crank, and means for controlling the position of said eccentric to vary the effective throw of said crank.

15. Windshield wiper actuating mechanism including, a unidirectional rotary driving member, an eccentric rotatably journaled on the driving member, a crank rotatably journaled on the eccentric having a crank pin at its outer end, means operatively connecting the driving member and the crank for imparting rotation thereto, and means controlling the position of said eccentric to control the orbit of said crank pin.

16. Windshield wiper actuating mechanism including, a unidirectional rotary driving member, an eccentric rotatably journaled on the driving member, a crank rotatably journaled on the eccentric having a crank pin at its outer end, a drive arm connected to the driving member and having a slot for slidably receiving said crank pin for imparting rotation to said crank during rotation of said driving member, and means for controlling the position of said eccentric to control the orbit of said crank pin.

17. Windshield wiper actuating mechanism including, a unidirectional rotary shaft, an eccentric rotatably journaled on said shaft, a crank arm rotatably journaled on the eccentric having a crank pin at its outer end, a drive arm connected to said shaft at its inner end and having a slot adjacent its outer end for slidably receiving said crank pin to drivingly interconnect said shaft and said crank arm, link means rotatably mounted on said crank pin, a wiper arm, connecting means between said link means and the wiper arm, and means controlling the position of said eccentric to control the orbit of said crank pin and thereby shift the path of movement of said wiper arm.

References Cited in the file of this patent

UNITED STATES PATENTS

| | | |
|---|---|---|
| Re. 23,412 | Hollis | Sept. 25, 1951 |
| 2,088,826 | Whitted | Aug. 3, 1937 |
| 2,173,447 | Horton | Sept. 19, 1939 |
| 2,325,804 | Shoemaker | Aug. 3, 1943 |
| 2,365,394 | Criswell | Dec. 19, 1944 |
| 2,450,692 | Sacchini | Oct. 5, 1948 |
| 2,455,089 | Schneider | Nov. 30, 1948 |
| 2,734,959 | Immel | Feb. 14, 1956 |
| 2,749,498 | Lautzenhiser | June 5, 1956 |
| 2,832,225 | Hart | Apr. 29, 1958 |